UNITED STATES PATENT OFFICE.

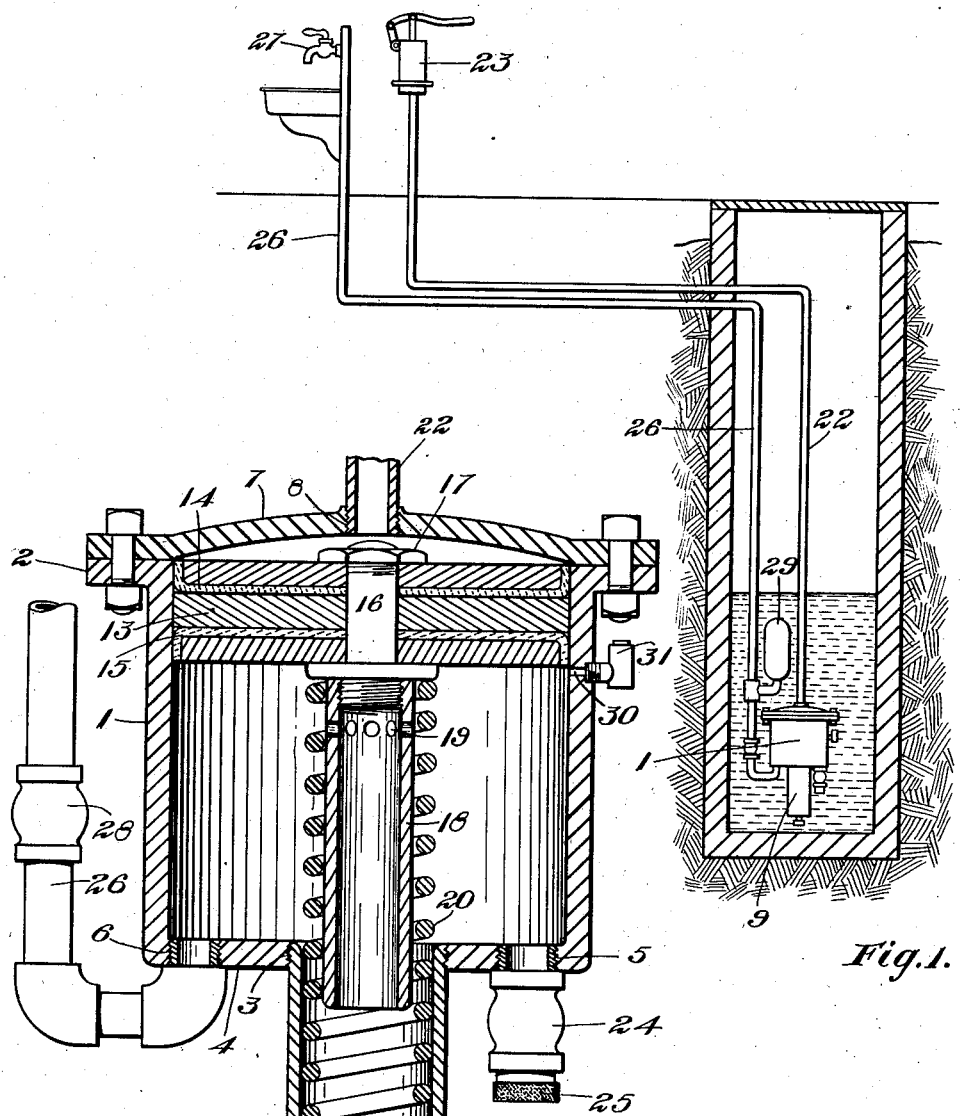

ROBERT CAIRNS, OF TORONTO, ONTARIO, CANADA.

HYDRAULIC PUMP.

973,473.  Specification of Letters Patent.  Patented Oct. 25, 1910.

Application filed May 25, 1909. Serial No. 498,313.

*To all whom it may concern:*

Be it known that I, ROBERT CAIRNS, a subject of the King of Great Britain, and resident of the city of Toronto, county of York, Province of Ontario, in the Dominion of Canada, have invented certain new and useful Improvements in Hydraulic Pumps, as described in the following specification.

The invention relates to improvements in hydraulic pumps, as described in the following specification and illustrated in the accompanying drawings that form part of the same.

The invention consists essentially in the novel construction and arrangement of parts whereby a piston operating in a cylinder and spring held against a column of water is operated to elevate water from a suitable supply by the application of pressure to the said water column.

The objects of the invention are, to eliminate the arduous work necessary in elevating water by suction means, to provide a device whereby the supply of water is maintained in the pipe leading from the pump to the discharge tap, to devise a pressure pump of simple and cheap construction by means of which water may be elevated and carried from the source of supply any desired distance with the minimum expenditure of energy, and which may be operated either by hand or by power to produce a constant supply of water.

In the drawings, Figure 1 is a sectional view of a well showing my device placed therein and the means for operating the same shown diagrammatically. Fig. 2 is a longitudinal sectional view of the pump.

Like numerals of reference indicate corresponding parts in each figure.

Referring to the drawings, 1 is a cylinder open at one end and having an outwardly extending flange 2 at said open end and a central threaded orifice 3 in the closed end 4 and the threaded orifices 5 and 6 in said closed end.

7 is a cap bolted securely to the flange 2 of the cylinder 1 and having a central threaded orifice 8 therein, the central portion of the cap being preferably slightly arched as shown.

9 is a length of pipe threaded into the central orifice 3 in the closed end 4 of the cylinder 1 and closed at its other end by the plug 10, said plug having a central threaded orifice 11 therethrough into which is threaded the set screw 12.

13 is a piston operating in the cylinder 1 and having the double cupped washers 14 and 15. The members of the piston 13 are held securely together by the stud 16 extending therethrough and securely clamped by the nut 17 secured on the threaded end of said stud.

18 is a length of pipe secured to the inner end of the stud 16 and having a plurality of openings 19 therethrough adjacent to the piston, said pipe being open at the other end.

20 is a spiral spring ensconced within the pipe 9 and encircling the pipe 18 bearing at one end against the piston 13 and at the other end against the cap 21 slidably arranged within the pipe 9 and resting against the inner end of the set screw 12. The tension of the spring 20 may be adjusted by means of the set screw 12 to the desired tension. The inner edge of the pipe 9 is rounded off as also is the outer and extreme end of the pipe 18 so that the spring will work freely and not catch upon the edges.

22 is a pipe secured in the threaded orifice 8 in the cap 7 and extending therefrom upwardly to a suitable pressure pump 23 or other pressure device located in any desired place and preferably adjacent to the point at which the water is to be drawn.

24 is a check valve secured in the threaded orifice 5 in the closed end of the cylinder 1 and opening inwardly and having a suitable screen 25 covering its outer and inlet end.

26 is a pipe leading from the orifice 6 in the closed end of the cylinder 1 to the tap 27 or other discharge means.

28 is a check valve arranged in the pipe 26 close to the cylinder 1 and opening outwardly from said cylinder. The check valves 24 and 28 are so arranged that a supply of water may be drawn into the cylinder through the check valve 24 preventing it from escaping therethrough and the valve 28 so arranged as to allow the outflow of water from the cylinder but preventing its return.

29 is an air chamber connected to the pipe 26 close to the cylinder 1.

30 is an air vent in the side of the cylinder arranged adjacent to the inner edge of the piston 13 when said piston is in its outermost position, that is to say, adjacent to the cap.

31 is an air float valve of a common and well known design adapted to allow the egress of an accumulation of air within the cylinder and to prevent the outflow of water.

In the use of this device the pipe 22 is filled with water or any other desired fluid and the pump 23 also filled so that its operating piston will be in its outermost position when the piston 13 within the cylinder 1 is at its outer end. The spring 20 is adjusted according to the weight of the column of water in the pipe 22 so as to slightly overbalance the said column of water and hold the piston to the outer end of the cylinder. On the application of pressure to the column of water in the pipe 22 by means of the pump 23 or by the application of steam or air pressure as may be found desirable, the piston 12 is forced inwardly against the pressure of the spring 20 and the water contained within the said cylinder is forced through the pipe 26. Immediately on the release of the pressure on the column of water in the pipe 22 the spring 20 forces the piston back to its normal position drawing the water inwardly through the check valve 24 so that on the next application of pressure to the said column of water the water in the said cylinder will again be forced up through the pipe 22. The spring returns the piston very quickly to its normal position so that by having a proper sized air chamber connected to the pipe leading from the pump cylinder a constant supply of water may be obtained at the outlet end while the pump is being operated.

The operating spring may be adjusted very accurately so that a very slight pressure against the column of water in the pipe 22 will cause the downward movement of the piston.

The pipe 18 secured to the piston forms a guide therefor and as the outer end of said pipe is open the water within the pipe 9 will circulate through the said pipe through the openings 19 in the inner end thereof. This feature obviates any back pressure against the column of water in the pipe 22 resultant from the compression of the spring and the movement of the said pipe 18 into the interior of the pipe 9. It will therefore be seen that as the spring is practically speaking balanced by the column of water in the pipe 22, the pressure exerted is required to be only sufficient to elevate the column of water in the pipe 26. As the water in the pipe 22 is retained there constantly, water may be drawn from the pipe 26 immediately on the application of pressure to the water in the pipe 22, thus doing away with the inconvenience and annoyance due to the great amount of pumping required with a suction pump before the water can be raised to the discharge point.

A small pressure pump is herein shown as the means for causing the elevation of the water but it must be understood that other means of applying pressure to the column of water can be used with equal facility, the several means that may be used are not however a part of this invention.

It will be seen that with a device such as herein described water may be elevated to a considerable distance and carried for almost any desired distance within reasonable bounds without difficulty and without materially affecting the operation of the pump.

The device is shown in the drawing in a vertical position but it must be understood that it may be placed in a horizontal position if so desired. In the event of it being placed in a horizontal position the air vent and air valve will not be required. Further the device is shown submerged in water in a well but it may be suspended above the water and a pipe carried from the suction inlet to the cylinder and extended into the water. It must also be understood that the device may be altered considerably in regard to its detailed construction without departing from the spirit of the invention, that is to say, so long as the piston is spring held against the weight of a column of water to be operated and to elevate water by the application of pressure to the water column.

What I claim as my invention is:—

1. In a hydraulic pump, a cylinder arranged within a well and having an inlet and an outlet in one end thereof and an opening in the opposite end, means for regulating the flow of water through said inlet and outlet, a pipe connected to the opening in the opposite end of the cylinder and leading upwardly to the surface of the ground and containing a fluid column, a piston operating in said cylinder, a spiral compression spring contained within said cylinder and exerting a pressure against said piston to support said fluid column, a threaded member centrally arranged in relation to said spring, a cap bearing against the outer end of said spring and abutting said screw member, and means connected to the upper end of said pipe leading from the opposite end of the cylinder for exerting a pressure against said fluid column.

2. In a hydraulic pump, a cylinder having an inlet and outlet and a central opening in one end thereof, a cylindrical casing secured in said central opening and closed at its outer end, a piston operating in said cylinder, a hollow stem secured to said piston and extending into said cylindrical casing and having a plurality of openings therethrough arranged adjacent to the piston, a spiral spring ensconced within said cylindrical casing and encircling said hollow stem and exerting a pressure against said piston and holding it in its outward position against the pressure of a column of water, means for controlling the flow of water through said inlet and outlet to said cylinder, and means for exerting pressure against said column of water to operate said piston.

3. In a hydraulic pump, a cylinder having an inlet and outlet and a central opening in one end thereof, a cylindrical casing secured in said central opening and closed at its outer end, a piston operating in said cylinder and having a stem extending from the center thereof and projecting into said cylindrical casing, a spiral spring arranged within said cylindrical casing and engaging the inner walls thereof and encircling the stem of said piston and at one end abutting said piston, means for adjusting the pressure of said spring engaging the outer end thereof, means for controlling the flow of water through the inlet and outlet to said cylinder, and means for exerting pressure against the opposite end of said piston to operate said piston against the pressure of said spring.

Signed at the city of Toronto, county of York, Province of Ontario, in the Dominion of Canada, this 18th day of May 1909.

ROBERT CAIRNS.

Witnesses:
 H. J. S. DENNISON,
 E. HERON.